UNITED STATES PATENT OFFICE 2,596,967

FLUORINE-CONTAINING ORGANOSILICON COMPOUNDS

Lawrence W. Frost, Pittsburgh, Pa., assignor to Westinghouse Electric Corporation, East Pittsburgh, Pa., a corporation of Pennsylvania No Drawing. Application November 19, 1948, Serial No. 61,144

14 Claims. (Cl. 260—46.5)

This invention relates to organosilicon compounds containing fluorine in the organic groups.

The object of this invention is to provide for preparing fluorine-containing organosilicon compounds by reacting unsaturated aliphatic and cycloaliphatic monomers having fluorine or fluorine and chlorine as the only substituents on carbon with alkenyl silicon compounds having hydrolyzable groups attached to silicon.

A further object of the invention is to provide for novel fluorine-containing organosiloxane fluids.

A still further object of the invention is to provide for resinous polymers comprising organosiloxanes containing fluorine in the organic groups attached to silicon.

Other objects of the invention will in part be obvious, and will in part appear hereinafter.

It has been discovered that fluorine and, in particular, radicals containing at least two fluorine atoms attached to a carbon atom may be introduced into organosilicon compounds by a vinyl-type polymerization reaction involving perhalogenated fluorine-containing unsaturated aliphatic and cycloaliphatic hydrocarbons having only fluorine and, in some cases, chlorine, the chlorine not exceeding the atoms of fluorine, with alkenyl silicon compounds.

More specifically, fluorine-containing organosilicon compounds having fluorine in the organic groups attached to silicon are produced by reacting one mole of an alkenyl silicon compound having the unit formula

where $R^1$ is a monovalent hydrocarbon radical having a terminal methylene group, the radical having the formula

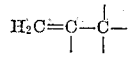

$R^2$ is a monovalent hydrocarbon radical selected from the group consisting of saturated hydrocarbons, phenyl and substituted phenyl radicals, $x$ has a value of from 1 to 3, $n$ has a value of from 0 to 2, and $Y$ is a monovalent hydrolyzable radical selected from the group consisting of hydrocarbonoxy, chlorine and fluorine radicals, and between 1 and 15 moles of a perhalogenated unsaturated hydrocarbon compound selected from the group consisting of monomeric, polymerizable aliphatic and cycloaliphatic compounds having only fluorine or fluorine and chlorine substituted thereon and with at least as many fluorine atoms as chlorine atoms. The reaction comprises the addition of the perhalogenated compound to the alkenyl silicon compound through the unsaturated groups of each.

Examples of suitable alkenyl groups $R^1$ for the silicon compound are allyl, methallyl, ethallyl, 1-methylallyl, 1-ethyl-2-methylallyl, 1-pentylallyl, 1, 1, 2-trimethylallyl, and hexen-1-yn-5-yl-3. Examples of suitable monovalent hydrocarbon, phenyl and substituted phenyl radicals $R^2$ are methyl, ethyl, propyl, butyl, amyl, octyl, dodecyl, phenyl, tolyl, xylyl, trifluoromethyl phenyl, monochlorophenyl, cyclohexyl, diethyl phenyl and trichlorophenyl.

Examples of specific suitable alkenyl silicon compounds are monoallyl silicon triethoxide, diallyl silicon dichloride, triallyl silicon ethoxide, methallyl silicon trichloride, allyl methyl silicon diethoxide, ethallyl phenyl silicon dichloride, diallyl methyl silicon ethoxide, dimethallyl methyl silicon chloride, allyl isopropenyl silicon diethoxide, methallyl trifluoromethylphenyl silicon diethoxide, diallyl methyl silicon chloride.

Examples of suitable perhalogenated unsaturated hydrocarbon compounds are tetrafluoroethylene; 1,1-dichloro-2,2-difluoroethylene; 1,1,2-trichloro-3,3,3-trifluoropropene; 2,3-dichloro-1,1,1,4,4,4-hexafluoro-2-butene; 1,2-dichlorohexafluorocyclopentene; and 1-chloro-1,2,2-trifluoroethylene.

The reaction between the alkenyl silicon compound and the unsaturated fluorine-containing perhalogenated unsaturated hydrocarbon compound is conducted by heating, preferably above 100° C. Since many of the perhalogenated unsaturated hydrocarbon compounds are gaseous, the reaction employing them must be carried out in an autoclave under pressure. Catalysts are not necessary. However, there may be employed the peroxide and ozonide catalysts promoting vinyl-type polymerization, suitable catalysts being benzoyl peroxide, t-butylperbenzoate and di-t-butyl-diperphthalate. The reaction product in either case may comprise a variety of different polymers. Fractionation may be employed to separate such reaction products from one another and from any unreacted residue. It has been found that, in some cases, the reaction produces polymers characterized by cross-linkage through the unsaturated groups of the alkenyl silicon compound and the unsaturated perhalogenated hydrocarbon compound. A typical polymer structure is as follows:

(a).

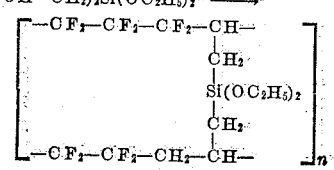

The reaction may also result in a novel type of fluorinated grouping as follows, admixed with the products of equation (a):

(b) $CF_2=CF_2 + (CH_2=CH-CH_2)_2Si(OC_2H_5)_2 \rightarrow$
$(C_5H_5F_4)(CH_2=CH-CH_2-)Si(OC_2H_5)_2$ (c) $2CF_2=CF_2 + (CH_2=CH-CH_2)_2Si(OC_2H_5)_2$
$\rightarrow (C_5H_5F_4)_2Si(OC_2H_5)_2$ (d) $2CCl_2=CF_2 + (CH_2=CH-CH_2)_2Si(OC_2H_5)_2$
$\rightarrow (C_5H_5Cl_2F_2)_2Si(OC_2H_5)_2$ The end products in equations (b), (c) and (d) have the characteristic group $(C_5H_5X_4)$ where $X_4$ represents at least two fluorine atoms and not more than two chlorine atoms. The group $C_5H_5F_4$ apparently is a saturated cycloaliphatic radical with the structure:

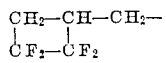

as determined by the usual tests for unsaturation, and the group $C_5H_5Cl_2F_2$ has a similar structural relation.

The reaction products so derived may be fractionated into the individual components or they may be employed as an admixture. In either case, the resulting hydrolyzable fluorine-containing organosilicon compounds may be subjected to hydrolysis and condensation in any suitable manner to produce organosiloxanes. Such siloxanes may be partially condensed fluids or gums that may be employed as such or dissolved in organic solvents and upon further heat treatment may be converted to solids. In certain cases, as will be explained hereinafter, certain of the substantially completely condensed siloxanes having the group $(C_5H_5X_4)_2$ are stable permanent liquids suitable for use as hydraulic fluids, lubricants, cooling media, and for other applications requiring a liquid compound capable of withstanding elevated temperatures without deterioration.

The presence in the organic radicals attached to silicon of fluorocarbon groups containing at least two fluorine atoms per carbon atom results in outstanding thermal stability in the entire organic radical comparable with the stability of Si—O—Si linkage. Such fluorine-containing organosiloxane compounds and polymers are excellent electrical insulating materials and may be employed for producing insulated conductors and similar structures for the electrical industry.

Porous materials, such as glass fiber cloth or mat, asbestos paper or asbestos cloth and inorganic cementitious molded members, may be treated or impregnated with the partially hydrolyzed or condensed fluorine-containing organosiloxanes which may be thereafter heat-treated to more highly polymerized organosiloxanes to produce members of any suitable degree of flexibility or hardness for various industrial or electrical applications.

The following examples are illustrative of the practice of the invention.

*Example I*

A mixture of 300 parts by weight of diallyldiethoxysilane was placed in a stainless steel autoclave into which gaseous tetrafluoroethylene was introduced until the pressure in the autoclave reached 450 p. s. i. This required approximately 400 parts by weight of the tetrafluoroethylene. The autoclave was then heated to 150° C. and maintained at this temperature with agitation for fifteen hours. After cooling to room temperature, a liquid reaction product was removed from the autoclave and rectified into a number of fractions. Approximately 135 parts by weight of a fraction boiling at 99° C. to 123° C. at 9 millimeters were separated and, upon purification, were found to consist mainly of the following product:

$(C_3H_5)(C_5H_5F_4)Si(OC_2H_5)_2$ having a boiling point of 103° C. at 10 millimeters; a melting point below —75° C.; and a density $d_4^{25}$ of 1.096. A second fraction comprising 67 parts by weight, when purified, was identified as the compound:

$(C_5H_5F_4)_2Si(OC_2H_5)_2$

This latter compound had a boiling point of 117° C. at 3 millimeters, a melting point of less than —75° C. and a density $d_4^{25}$ of 1.259. The residue, approximately 111 parts by weight, was gummy copolymer of tetrafluorethylene and diallyl diethoxysilane linked through their unsaturated groups.

Ten parts by weight of this residue were dissolved in 8 parts by weight of acetone, and to the resulting solution there was added 2 parts by weight of water with vigorous stirring to produce a hydrolyzed and partially condensed viscous organosiloxane liquid. The resulting organosiloxane liquid was applied to glass cloth and baked for 1.25 hours at 125° C. The treated cloth was flexible and slightly tacky after this treatment. Sixteen layers of treated fiber glass sheets were then superimposed and pressed for one hour at 250° C. and 1000 p. s. i. A glossy flexible laminated board resulted. By heating for 7 hours further at 250° C., the laminate was rendered extremely hard.

The reaction of Example I was repeated including 3 parts by weight of benzoyl peroxide. The reaction product was a gel, and upon hydrolyzing and condensing it was readily converted to a hard, insoluble, infusible solid.

*Example II*

There were introduced into a stainless steel autoclave 123 parts by weight of allyl methyl silicon diethoxide, 2 parts by weight of benzoyl peroxide and 138 parts by weight of tetrafluoroethylene at a pressure of 300 p. s. i. The autoclave was agitated for 23 hours in the temperature range of between 146° C. and 181° C. At the end of this time, a liquid reaction product was removed from the autoclave and fractionated by distillation under a vacuum. Fifty-five parts by weight of the following crude compound were separated:

$(C_5H_5F_4)(CH_3)Si(OC_2H_5)_2$

Upon purification, the compound was found to have a boiling point of 201° C., a melting point below —70° C., and a density $d_4^{25}$ of 1.096.

A mixture composed of 52 parts by weight of the compound $(C_5H_5F_4)(CH_3)Si(OC_2H_5)_2$, 40 parts by weight of toluene, 50 parts by weight of water, 40 parts of 95% ethanol and 10 parts by weight of 12N hydrochloric acid was refluxed with stirring for one hour. The organic or non-aqueous layer was separated, washed with water, and stirred for two hours at room temperature with 150 parts by weight of 50% sulphuric acid. The organic layer was again separated, washed with sodium bicarbonate solution and water, and filtered. The organic layer was placed in an oven and heated to 100° C. for sixteen hours to drive off all of the toluene and ethanol solvent, thereby leaving a yellow oily liquid residue. The yellow liquid was further heat-treated for three hours at 200° C. to drive off any low polymers. It was found to constitute an excellent lubricating fluid with outstanding thermal stability. Its coefficient of friction on steel against steel was 0.167. The viscosity varied with the temperature as follows:

| Viscosity, cs. | Temperature, °C. |
|---|---|
| 194 | 37.8 |
| 48 | 65 |
| 15.3 | 99 |

*Example III*

A mixture of 50 parts by weight of the compound $(C_5H_5F_4)_2Si(OC_2H_5)_2$ derived from Example I, 40 parts by weight of toluene, 40 parts by weight of 95% ethanol, 25 parts by weight of water and 5 parts by weight of 12N hydrochloric acid was refluxed with vigorous stirring for two hours. The mixture was diluted with 50 parts by weight of water and the organic layer was separated and washed once with water. The organic layer was then heated in an oven at 100° C. for sixteen hours to evaporate the toluene and then the residual oil was heated for two hours at 200° C. A pale yellow oil was obtained having the following physical properties:

$n_D^{25}$ 1.4045
$d_4^{25}$ 1.508

Coefficient of friction (steel on steel) 0.158.

| Viscosity, cs. | Temperature, °C. |
|---|---|
| 992 | 37.8 |
| 140 | 65 |
| 29.7 | 99 |

Dielectric constant at 25° C., 15.7.

*Example IV*

A mixture of 95 parts by weight of allyl dimethyl silicon ethoxide, 2 parts of benzoyl peroxide and 66 parts of tetrafluoroethylene was reacted in a steel autoclave for twenty-four hours at a temperature range from 150° C. to 180° C. Among the fractions secured by distilling the resulting reaction product was the compound $(C_5H_5F_4)(CH_3)_2SiOC_2H_5$ having a boiling point of 176° C., melting point below −75° C., and density $d_4^{25}$ of 1.092.

*Example V*

A mixture of 144 parts by weight of allyl dimethyl silicon ethoxide, 133 parts by weight of 1,1-dichloro-2,2-difluoroethylene and 4 grams of benzoyl peroxide was sealed in a stainless steel autoclave and agitated for eighteen hours while at a temperature of between 148° C. and 180° C. Upon opening the autoclave, a liquid reaction product was obtained which was fractionated to produce 72 parts by weight of the compound $(C_5H_5Cl_2F_2)(CH_3)_2SiOC_2H_5$ which, when purified, was found to have a boiling point of 220° C., melting point below −75° C., and density $d_4^{25}$ of 1.159.

A mixture of 55.4 parts by weight of the compound $(C_5H_5Cl_2F_2)(CH_3)_2SiOC_2H_5$, 45 parts by weight of toluene, 40 parts by weight of isopropanol, 50 parts by weight of water and 25 parts by weight of 12N hydrochloric acid was refluxed for three hours. After adding an excess of water, the liquid separated into two layers and the organic solvent layer was removed and washed twice with dilute sodium chloride solution. The solvent was removed from the layer by distillation and 39 parts by weight of the following dimer were separated:

$[(C_5H_5Cl_2F_2)(CH_3)_2Si]_2O$

The dimer had a boiling point of 140° C. to 144° C. at 2 millimeters, a melting point of from 0° C. to 4° C., and density $d_4^{25}$ of 1.273. The dimer had outstanding chemical stability. Refluxing for two hours with 10% alcoholic potassium hydroxide produced no observable change. Further refluxing for three hours with zinc and alcohol also produced no change.

A series of reaction products were prepared by reacting equimolar amounts of the following olefins and allyl silicon compounds for twenty hours at 150° C.

| Olefin | Allyl Compound | Catalyst | Product |
|---|---|---|---|
| $CCl_2=CF_2$ | $C_2H_5Si(OC_2H_5)_3$ | Benzoyl peroxide | White powder. |
| Do | do | none | Yellow glass. |
| Do | $(C_3H_5)_2Si(OC_2H_5)_2$ | Benzoyl peroxide | White powder. |
| Do | do | none | Brown glass. |
| $CF_3$—$CCl=CCl_2$ | do | Benzoyl peroxide | Do. |
| $CF_3$—$CCl=CCl$—$CF_3$ | do | do | Amber glass. |
| $CCl=CCl$<br>$\|$  $\|$<br>$CF_2$  $CF_2$<br>$\backslash$ /<br>$CF_2$ | do | do | Brown glass. |

The "product" mentioned in the last column in each case was produced by boiling the reaction product for one hour with a mixture of toluene, ethanol, water and hydrochloric acid, as set forth in Example III, and the resulting hydrolysis products were baked for twelve hours at 200° C. and produced the solids indicated in the above table.

Since certain changes in carrying out the process embodied in the invention described herein may be made without departing from its scope, it is intended that all matter contained in the above description shall be interpreted as illustrative and not in a limiting sense.

I claim as my invention:

1. An organosilicon compound with fluorine in the organic groups comprising the reaction product derived by heating (a) one mole of an allyl silane compound having the formula $H_2C=CH—CH_2)_x—SiY_{4-x}$ where Y is a monovalent hydrolyzable radical selected from the group consisting of hydrocarbonoxy, chlorine and fluorine radicals and $x$ is a whole number from 1 to 3, and (b) from 1 to 15 moles of perhalogenated ethylene having from 0 to 2 chlorine atoms and the balance being fluorine atoms.

2. A fluid organosiloxane comprising the polymer having the repeating unit formula $$[(C_5H_5F_4)_2SiO-]_x$$

where the group $C_5H_5F_4$ is a saturated cycloaliphatic group having the formula

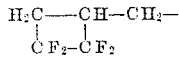

and $x$ is at least 3.

3. A fluid organosiloxane comprising the polymer having the repeating unit formula $$[(C_5H_5F_4)(CH_3)SiO-]_x$$

where the group $C_5H_5F_4$ is a saturated cycloaliphatic group having the formula

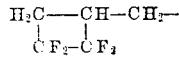

and $x$ is at least 3.

4. The compound $[(C_5H_5Cl_2F_2)(CH_3)_2Si]_2O$ where the group $C_5H_5Cl_2F_2$ is a saturated cycloaliphatic group having the formula

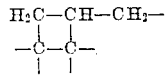

with chlorine and fluorine attached to the carbon atoms having two free valences.

5. An organosilicon compound with fluorine in the organic groups comprising the copolymer reaction product derived by heating to copolymerization (a) one mole of an alkenyl silane compound having the unit formula $$R^1{}_xR^2{}_nSiY_{[4-(x+n)]}$$

where $R^1$ is a monovalent beta-gamma olefinic hydrocarbon radical having a terminal methylene group, $R^2$ is a monovalent hydrocarbon radical selected from the group consisting of saturated aliphatic and cycloaliphatic hydrocarbons, phenyl and substituted phenyl radicals, the substituents on phenyl being selected from the group consisting of saturated aliphatic hydrocarbons, halides and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric polymerizable aliphatic and cycloaliphatic compounds having halogen selected from the group consisting of fluorine and chlorine substituted thereon and with at least as many fluorine atoms as chlorine atoms being present, the copolymer reaction between (a) and (b) being effected by linking through the olefinic radical $R^1$ and the unsaturated group in the perhalogenated unsaturated hydrocarbon compound.

6. An organopolysiloxane containing fluorinated organic groups comprising the copolymer reaction product derived by heating (a) one mole of an alkenyl silane compound having the unit formula $$R^1{}_xR^2{}_nSiY_{[4-(x+n)]}$$

where $R^1$ is a monovalent beta-gamma olefinic hydrocarbon radical having a terminal methylene group, $R^2$ is a monovalent hydrocarbon radical selected from the group consisting of saturated aliphatic and cycloaliphatic hydrocarbons, phenyl and substituted phenyl radicals, the substituents on phenyl being selected from the group consisting of saturated aliphatic hydrocarbons, halides and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric polymerizable aliphatic and cycloaliphatic compounds having halogen selected from the group consisting of fluorine and chlorine substituted thereon and with at least as many fluorine atoms as chlorine atoms being present, the copolymer reaction between (a) and (b) being effected by linking through the olefinic radical $R^1$ and the unsaturated group in the perhalogenated unsaturated hydrocarbon compound, and thereafter hydrolyzing and condensing the copolymer reaction product to produce the organosiloxane.

7. An article of manufacture comprising a fibrous material and applied thereto the liquid hydrolyzed and partially condensed polymeric reaction product derived by heating (a) one mole of an alkenyl silane compound having the unit formula $$R^1{}_xR^2{}_nSiY_{[4-(x+n)]}$$

where $R^1$ is a monovalent beta-gamma olefinic hydrocarbon radical having a terminal methylene group, $R^2$ is a monovalent hydrocarbon radical selected from the group consisting of saturated hydrocarbons, phenyl and substituted phenyl radicals, the substituents on phenyl being selected from the group consisting of saturated aliphatic hydrocarbons, halides and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric, polymerizable aliphatic and cycloaliphatic compounds having halogen selected from the group consisting of fluorine and chlorine substituted thereon and with at least as many fluorine atoms as chlorine atoms being present, the copolymer reaction between (a) and (b) being effected by linking through the olefinic radical $R^1$ and the unsaturated group in the perhalogenated unsaturated hydrocarbon compound, the polymeric silane reaction product being hydrolyzed and condensed to produce a liquid siloxane reaction product, the liquid siloxane being applied to the fibrous material and the siloxane reaction product being heated until it has been converted to a solid.

8. In the process of preparing organosilicon copolymers having fluorine present in the organic groups, the steps comprising admixing and heating to effect copolymerization of (a) one mole of an alkenyl silane compound having the unit formula $$R^1{}_xR^2{}_nSiY_{[4-(x+n)]}$$

where $R^1$ is a monovalent beta-gamma olefinic hydrocarbon radical having a terminal methylene group, $R^2$ is a monovalent hydrocarbon radical selected from the group consisting of saturated aliphatic and cycloaliphatic hydrocarbons, phenyl and substituted phenyl radicals, the substituents on phenyl being selected from the group consisting of saturated aliphatic hydrocarbons, halides, and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric polymerizable aliphatic and cycloaliphatic compounds having halogen selected from the group consisting of fluorine and chlorine substituted thereon and with at least as many fluorine atoms as chlorine atoms being present, the copolymer reaction between (a) and (b) being effected by linking through the olefinic radical $R^1$ and the unsaturated group in the perhalogenated unsaturated hydrocarbon compound.

9. In the process of preparing organosiloxanes having fluorine present in the organic groups, the steps comprising admixing and heating to effect copolymerization of (a) one mole of an alkenyl silane compound having the unit formula $$R^1_xR^2_nSiY_{[4-(x+n)]}$$

where $R^1$ is a monovalent beta-gamma olefinic hydrocarbon radical having the terminal methylene group, $R^2$ is a monovalent hydrocarbon radical selected from the group consisting of saturated aliphatic and cycloaliphatic hydrocarbons, phenyl and substituted phenyl radicals, the substituents on phenyl being selected from the group consisting of saturated aliphatic hydrocarbons, halides, and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric polymerizable aliphatic and cycloaliphatic compounds having halogen selected from the group consisting of fluorine and chlorine substituted thereon and with at least as many fluorine atoms as chlorine atoms being present, the copolymer reaction between (a) and (b) comprising linking through the olefinic radical $R^1$ and the unsaturated group in the perhalogenated unsaturated hydrocarbon compound, and thereafter hydrolyzing and condensing the reaction product to produce the organosiloxane.

10. In the process of preparing organosiloxanes having fluorine present in the organic groups, the steps comprising admixing and heating to effect copolymerization of (a) one mole of an alkenyl silane compound having the unit formula $$R^1_xR^2_nSiY_{[4-(x+n)]}$$

where $R^1$ is a monovalent beta-gamma olefinic hydrocarbon radical having a terminal methylene group, $R^2$ is a monovalent hydrocarbon radical selected from the group consisting of saturated aliphatic and cycloaliphatic hydrocarbons, phenyl and substituted phenyl radicals, the substituents on phenyl being selected from the group consisting of saturated aliphatic hydrocarbons, halides, and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric polymerizable aliphatic and cycloaliphatic compounds having halogen selected from the group consisting of fluorine and chlorine substituted thereon and with at least as many fluorine atoms as chlorine atoms being present and (c) a small amount of a peroxide catalyst for promoting addition polymerization, the copolymer reaction between (a) and (b) comprising linking through the unsaturated radical $R^1$ and the unsaturated group in the perhalogenated unsaturated hydrocarbon compound, and thereafter hydrolyzing and condensing the reaction product to produce the organosiloxane.

11. An organopolysiloxane containing fluorinated organic groups comprising the reaction product derived by heating to effect copolymerization of (a) one mole of an alkenyl silane compound having the unit formula $$R^1_xR^2_nSiY_{[4-(x+n)]}$$

where $R^1$ is a monovalent beta-gamma olefinic hydrocarbon radical having a terminal methylene group, $R^2$ is a monovalent hydrocarbon radical selected from the group consisting of saturated aliphatic and cycloaliphatic hydrocarbons, phenyl and substituted phenyl radicals, the substituents on phenyl being selected from the group consisting of saturated aliphatic hydrocarbons, halides, and halogen substituted saturated aliphatic hydrocarbon radicals, $x$ is a whole number from 1 to 3, $n$ is a whole number from 0 to 2, the sum of $x$ plus $n$ not exceeding 3, and Y is a monovalent hydrolyzable radical selected from the group consisting of hydrocarbonoxy, chlorine and fluorine radicals, and (b) between 1 and 15 moles of a perhalogenated unsaturated hydrocarbon compound selected from the group consisting of monomeric polymerizable aliphatic and cycloaliphatic compounds having halogen selected from the group consisting of fluorine and chlorine substituted thereon and with at least as many fluorine atoms as chlorine atoms being present, the reaction between (a) and (b) comprising linking through the olefinic radical $R^1$ and the unsaturated group in the perhalogenated unsaturated hydrocarbon compound, the reaction product being fractioned to remove low boiling, cyclic polymeric materials, and thereafter hydrolyzing and condensing the residual reaction product to produce the organosiloxane.

12. A fluid organopolysiloxane containing fluorinated hydrocarbon groups comprising the copolymer reaction product derived by heating to copolymerization (a) one mole of an alkenyl silane having the following unit formula $$R_2SiY_2$$

where R is a monovalent beta-gamma olefinic hydrocarbon radical having a terminal methylene group, and Y is a monovalent hydrolyzable radical selected from the group consisting of hydrocarbonoxy, chlorine and fluorine radicals and (b) at least two moles of a perhalogenated olefinically unsaturated hydrocarbon compound selected from the group consisting of monomeric polymerizable aliphatic and cycloaliphatic compounds having halogen selected from the group consisting of fluorine and chlorine substituted thereon and with at least as many fluorine as chlorine atoms, the copolymer reaction between (a) and (b) comprising linking through the unsaturated groups in the R radical and the perhalogenated olefinic hydrocarbon to provide a saturated cyclic radical, separating the copolymer reaction product from any other products involved in the reaction, and thereafter hydrolyzing and condensing the copolymer reaction product to produce a liquid organopolysiloxane.

13. A fluid organopolysiloxane containing fluorinated hydrocarbon groups comprising the copolymer reaction product derived by heating to copolymerization (a) one mole of an alkenyl silane having the following unit formula $$R_2SiY_2$$

where R is a monovalent beta-gamma olefinic hydrocarbon radical having a terminal methylene group, and Y is a monovalent hydrolyzable radical selected from the group consisting of hydrocarbonoxy, chlorine and fluorine radicals and (b) at least two moles of a perfluorinated olefinically unsaturated hydrocarbon compound selected from the group consisting of monomeric polymerizable aliphatic and cycloaliphatic compounds, the copolymer reaction between (a) and (b) comprising linking through the unsaturated groups in the R radical and the perfluorinated olefinic hydrocarbon to provide a saturated cyclic radical, the copolymer reaction product being separated from any other products involved in the reaction, and thereafter hydrolyzing and condensing the copolymer reaction product to produce a liquid organopolysiloxane.

14. An organopolysiloxane containing fluorinated hydrocarbon groups comprising the copolymer reaction product derived by heating to copolymerization (a) one mole of an alkenyl silane having the formula $$R^1R^2_nSiY_{(3-n)}$$

where $R^1$ is a monovalent beta-gamma olefinic hydrocarbon radical having a terminal methylene group, $R^2$ is a monovalent hydrocarbon radical selected from the group consisting of methyl, phenyl and substituted phenyl radicals the substituents on phenyl being selected from the group consisting of saturated aliphatic hydrocarbon, halide and halogen substituted saturated aliphatic hydrocarbon radicals, $n$ being a whole number from 1 to 2, and Y is a monovalent hydrolyzable radical selected from the group consisting of hydrocarbonoxy, fluorine and chlorine radicals and (b) at least one mole of a perhalogenated olefinically unsaturated hydrocarbon compound selected from the group consisting of monomeric polymerizable aliphatic and cycloaliphatic compounds having halogen selected from the group consisting of fluorine and chlorine substituted thereon and with at least as many fluorine as chlorine atoms, the copolymer reaction between (a) and (b) comprising linking through the unsaturated groups in the $R^1$ radical and the perhalogenated olefinic hydrocarbon to provide a saturated cyclic radical, the copolymer reaction product being separated from any other products involved in the reaction, and thereafter hydrolyzing and condensing the copolymer reaction product to produce a liquid organopolysiloxane.

LAWRENCE W. FROST.

REFERENCES CITED

The following references are of record in the file of this patent:

UNITED STATES PATENTS

| Number | Name | Date |
|---|---|---|
| 2,258,219 | Rochow | Oct. 7, 1941 |
| 2,420,912 | Hurd | May 20, 1947 |
| 2,462,345 | Barrick | Feb. 22, 1949 |
| 2,465,731 | Kropa | Mar. 29, 1949 |
| 2,468,664 | Hanford | Apr. 26, 1949 |
| 2,469,154 | Bunnell et al. | May 3, 1949 |